US012181103B2

(12) United States Patent
Muehleder et al.

(10) Patent No.: US 12,181,103 B2
(45) Date of Patent: Dec. 31, 2024

(54) SAFETY VALVE AND TANK

(71) Applicant: Robert Bosch GmbH, Stuttgart (DE)

(72) Inventors: Friedrich Muehleder, Muehlacker (DE); Raed Hamada, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 10 days.

(21) Appl. No.: 18/255,168

(22) PCT Filed: Oct. 28, 2021

(86) PCT No.: PCT/EP2021/079990
§ 371 (c)(1),
(2) Date: May 31, 2023

(87) PCT Pub. No.: WO2022/117267
PCT Pub. Date: Jun. 9, 2022

(65) Prior Publication Data
US 2024/0003499 A1   Jan. 4, 2024

(30) Foreign Application Priority Data
Dec. 4, 2020 (DE) .................. 10 2020 215 381.7

(51) Int. Cl.
| F17C 13/04 | (2006.01) |
| F16K 17/38 | (2006.01) |
| F17C 13/12 | (2006.01) |

(52) U.S. Cl.
CPC .............. *F17C 13/04* (2013.01); *F16K 17/38* (2013.01); *F17C 13/123* (2013.01); *F17C 13/12* (2013.01);
(Continued)

(58) Field of Classification Search
CPC .............................. F17C 13/04; F17C 13/123; F17C 2205/0332; F17C 2221/012;
(Continued)

(56) References Cited

U.S. PATENT DOCUMENTS 3,199,523 A * 8/1965 Mceathron .............. F15B 21/00
 137/557
3,842,853 A * 10/1974 Kelly .................... F16K 17/383
 137/75
(Continued)

FOREIGN PATENT DOCUMENTS

| DE | 69618127 T2 | 8/2002 |
| DE | 60309339 T2 | 5/2007 |

(Continued)

OTHER PUBLICATIONS

Translation of International Search Report for Application No. PCT/EP2021/079990 date Feb. 16, 2022 (2 pages).

*Primary Examiner* — Minh Q Le
(74) *Attorney, Agent, or Firm* — Michael Best & Friedrich LLP (57) ABSTRACT

The invention relates to a safety valve comprising a valve body with a guide bore which defines a longitudinal axis, a first opening which is formed on a base of the guide bore, and a second opening which is formed at a distance to the base along the longitudinal axis and which extends along a radial direction extending transversely to the longitudinal axis; a valve needle which is movably mounted in the guide bore of the valve body in an axial direction and which comprises a seal surface facing the first opening; a compression spring device with a spring that is compressed by a deflection and thereby biases the valve needle along the longitudinal axis into a seal position, in which the seal surface of the valve needle seals the first opening; and a thermally activatable trigger unit which has an extension along the longitudinal axis, said extension being greater than the deflection, and which is designed to collapse when a trigger temperature is reached, wherein the compression spring device is supported against the trigger unit.

19 Claims, 5 Drawing Sheets

(52) U.S. Cl.
CPC .............. *F17C 2205/0317* (2013.01); *F17C 2205/0332* (2013.01); *F17C 2221/012* (2013.01); *F17C 2223/0123* (2013.01); *F17C 2223/036* (2013.01); *F17C 2260/042* (2013.01); *F17C 2270/0178* (2013.01); *Y02E 60/32* (2013.01)

(58) Field of Classification Search
CPC ........ F17C 2223/0123; F17C 2260/042; F17C 2270/0178; F17C 13/12; F17C 2205/0317; F17C 2223/036; F16K 17/38; Y02E 60/32
USPC ............... 137/468, 68.11, 72, 76, 467, 457; 169/37, 42
See application file for complete search history.

(56) References Cited

U.S. PATENT DOCUMENTS

| | | | | |
|---|---|---|---|---|
| 5,511,576 | A * | 4/1996 | Borland | F16K 17/383 |
| | | | | 137/72 |
| 5,632,297 | A | 5/1997 | Sciullo et al. | |
| 6,286,536 | B1 * | 9/2001 | Kamp | F16K 17/38 |
| | | | | 137/68.13 |
| 6,382,232 | B1 * | 5/2002 | Portmann | F16K 13/06 |
| | | | | 102/275.1 |
| 7,814,925 | B2 * | 10/2010 | Nomichi | F16K 3/265 |
| | | | | 137/72 |
| 8,596,372 | B2 * | 12/2013 | Zhang | A62C 37/14 |
| | | | | 102/370 |
| 9,309,981 | B2 * | 4/2016 | Porterfield | F16K 17/14 |
| 2008/0217572 | A1 * | 9/2008 | Job | F16K 17/38 |
| | | | | 251/337 |
| 2010/0078078 | A1 * | 4/2010 | Daido | F16K 17/383 |
| | | | | 137/72 |
| 2013/0082054 | A1 | 4/2013 | Groben | |
| 2014/0261742 | A1 * | 9/2014 | Heise | H01M 8/04776 |
| | | | | 137/72 |
| 2015/0159764 | A1 * | 6/2015 | Peli | F16K 17/383 |
| | | | | 137/72 |
| 2016/0208934 | A1 * | 7/2016 | Carter | F16K 5/0642 |
| 2016/0238151 | A1 * | 8/2016 | Carter | F16K 5/0663 |
| 2017/0335984 | A1 * | 11/2017 | Carter | F16K 17/406 |
| 2019/0219187 | A1 * | 7/2019 | Kunberger | F16K 31/025 |
| 2020/0018411 | A1 * | 1/2020 | Kato | F16K 17/383 |
| 2023/0332707 | A1 * | 10/2023 | Perthel | F16K 17/38 |

FOREIGN PATENT DOCUMENTS

| | | |
|---|---|---|
| FR | 3008767 A1 | 1/2015 |
| JP | H09119539 A | 5/1997 |
| JP | 2000283396 A | 10/2000 |
| JP | 2005526941 A | 9/2005 |
| JP | 2007255700 A | 10/2007 |

* cited by examiner

SAFETY VALVE AND TANK

BACKGROUND

The present invention relates to a safety valve and a tank, in particular for a motor vehicle.

Hydrogen is gaining increasing importance as an energy source. Hydrogen or gases in general are typically stored in closed containers at a pressure greater than the ambient pressure. The containers are typically equipped with safety valves to enable a controlled release of the gas if the pressure inside the container exceeds a threshold value or if this action is required for other reasons, such as in the event of a fire.

U.S. Pat. No. 5,632,297 A, for example, describes a safety valve that triggers in the event of an overpressure as well as when a threshold temperature is reached. The safety valve comprises a valve body having a bore at the base of which a first opening is formed and at the side circumference of which a second opening is formed at a distance to the base, a piston guided in the bore, a compression spring, a stop piece, and a plug melting at the threshold temperature. The compression spring is supported on the piston and on the stop piece. The stop piece in turn abuts the plug so that the spring presses the piston to the first opening in a sealing manner. As the plug melts, the force exerted by the spring via the stop piece, as well as a force exerted by gas on the piston, pushes the material of the plug away so that the piston can be lifted from the first opening by the gas.

SUMMARY

According to the invention, there is provided a safety valve as well as a tank.

According to a first aspect of the invention, there is provided a safety valve, in particular for a gas tank. The safety valve comprises a valve body with a guide bore which defines a longitudinal axis, a first opening which is formed on a base of the guide bore, and a second opening which is formed at a distance to the base along the longitudinal axis and which extends along a radial direction extending transversely to the longitudinal axis; a valve needle which is movably mounted in the guide bore of the valve body in an axial direction and which comprises a seal surface facing the first opening; a compression spring device with a spring that is compressed by a deflection, in particular in relation to an unstressed state or a state in which the spring abuts a stop, and thereby biases the valve needle along the longitudinal axis into a seal position, in which the seal surface of the valve needle seals the first opening; and a thermally activatable trigger unit which has an extension or length along the longitudinal axis, said extension or length being greater than the deflection, and which is designed to collapse when a trigger temperature is reached, wherein the compression spring device is supported against the trigger unit.

According to a second aspect of the invention, a tank is provided, in particular for a motor vehicle. The tank comprises a container for holding a gas, in particular for receiving hydrogen, and a safety valve according to the first aspect of the invention.

A concept underlying the invention is that in a safety valve, which triggers when a threshold pressure is exceeded as well as when a threshold temperature is exceeded, a sizing of a trigger unit, which collapses upon reaching the threshold temperature, and deflection of a spring are attuned to one another such that, when the trigger unit has collapsed, the valve needle of the safety valve which seals the opening to the container is freely movable in the axial direction, in particular without being exposed to a spring force. In the safety valve according to the invention, a spring of a compression spring device is compressed by a certain deflection. That is to say, the spring is compressed by a certain path relative to the unstressed state or relative to a state in which it is supported on two axially opposed stops. The valve needle is biased into the seal position by the spring force. The trigger unit is supported on the valve needle and the compression spring device, and the compression spring device is supported on a stop of the valve body. Alternatively, the compression spring device is supported directly on the valve needle and on the trigger unit, which in turn is supported on a stop of the valve body. In both cases, the trigger unit is longer than the deflection of the spring. That is to say, the trigger unit is designed in order to release a path that is longer than the deflection, for example when it breaks. This kinematically decouples the spring and valve needle from one another and releases the valve needle in the axial direction.

This design releases the seal position of the valve needle with improved reliability in the event of a temperature-based trigger. In particular, the force must be applied by the gas passing through the first opening of the valve body to the valve body in order to remove it from the seal position is advantageously reduced, because no spring force must be overcome. Thus, the safety of the valve is further improved.

According to some embodiments, the safety valve can comprise a locking device with a locking body that is movably mounted in a locking recess of the valve body extending in the radial direction and a spring which biases the locking body in the radial direction towards the longitudinal axis; wherein the second opening of the valve body is arranged in relation to the longitudinal axis between the locking recess and the base; and wherein the valve needle comprises a locking groove, which is positioned in a seal position of the valve needle between the locking recess and the base of the valve body at a predetermined distance to the locking recess, and wherein the locking body engages with the locking groove in a lock position in which said body projects into the guide bore when the valve needle is retracted by the predetermined distance to the first opening. Accordingly, a latching mechanism is provided, which axially fixes the valve body in a release position, wherein, in the release position of the valve body, the seal surface is arranged at a distance to the base of the guide bore, and the locking groove is arranged at the level of the locking bore in relation to the longitudinal axis. Thus, it is reliably prevented that the seal surface abuts the base of the guide bore again and seals the first opening when the valve needle is lifted by a stroke corresponding to the distance between the locking bore and the locking groove in the seal position of the valve needle, for example when the trigger unit has collapsed. Thus, an irreversible opening or draining operation is ensured, further improving the reliability of the valve.

According to some embodiments, it can be provided that the locking body is a ball. This advantageously provides a constructively simple solution.

According to some embodiments, it can be provided that the compression spring device comprises a spring sleeve having a base and a collar lying opposite said base, and wherein the spring is configured as a spiral spring, which is supported on the collar of the spring sleeve and a stop arranged opposite the base of the guide bore with respect to the longitudinal direction and in a positionally fixed manner in relation to said base, and wherein the trigger unit is supported on the base of the spring sleeve and an end of the valve needle lying opposite the seal surface. For example, the spring sleeve can comprise a sleeve body, wherein the base is arranged at a first end of the sleeve body, and the collar, which projects in a radial direction outward from the sleeve body, is arranged at a second end of the sleeve body. The spring sleeve is preferably positioned in the valve body such that the collar faces the base of the guide bore in relation to the longitudinal axis. The stop on which the spring is supported can be configured, for example, as a screw-on lid that is screwed to the valve body. A spiral spring offers the advantage that it can be produced inexpensively, and at the same time its bias can be adjusted very precisely. The arrangement of the trigger unit so as to support the valve needle and the base of the sleeve causes the trigger unit to project into the sleeve body. Thus, a compact design is achieved in the axial direction. At the same time, the spring is spatially separated from the trigger unit by the spring sleeve, so that mutual functional impairments are prevented.

According to some embodiments, it can be provided that the valve body comprises a shoulder surface, which surrounds an end of the guide bore lying opposite the base of the guide bore in relation to the radial direction, wherein the collar of the spring sleeve is arranged so as to face the shoulder surface and at a distance to the shoulder surface, and wherein the collar is made to rest on the shoulder surface by the spring when the trigger unit has collapsed. For example, the guide bore can open into a plenum or cavity of the valve body in which the spring sleeve and the spiral spring are arranged. The valve body has a shoulder or stop surface, which delimits the plenum in relation to the longitudinal axis and from which the guide bore extends. When the trigger unit collapses, the spring pushes the spring sleeve against the stop or shoulder surface. Thus, a further movement of the spring sleeve towards the valve body is stopped by the shoulder surface, thereby even more reliably preventing the valve body from being undesirably pushed into the seal position when the trigger unit has collapsed.

According to some embodiments, it can be provided that an outer diameter of the valve needle and an inner diameter of the spring sleeve are sized such that the valve needle is at least partially insertable into the spring sleeve when the trigger unit has collapsed. Thus, after the trigger unit collapses, the valve needle can be at least partially received in the spring sleeve. This results in a compact design, on the one hand. On the other hand, this further facilitates the kinematic decoupling of the compression spring device and the valve needle from one another after the collapse of the trigger unit.

According to some embodiments, it can be provided that the compression spring device comprises a spring carrier, and the spring is configured as a poppet spring, which is connected to the spring carrier and is supported on an end of the valve needle lying opposite the seal surface, and wherein the trigger unit is supported on the spring carrier and a stop arranged opposite the base of the guide bore with respect to the longitudinal direction and in a positionally fixed manner in relation to said base. For example, the spring carrier can be substantially plate-shaped. A poppet spring provides the advantage that it is very compact in relation to the axial direction. For example, in the unstressed state in relation to the longitudinal axis, the poppet spring can have an extension that ranges between 5% and 20%, in particular between 7% and 12%, of the length of the trigger unit. Thus, the kinematic decoupling of the compression spring device and the valve needle from one another is assured in a very simple manner after the trigger unit collapses.

According to some embodiments, it can be provided that the valve body has an outer threading with which the valve body can be screwed into an opening of a container. Thus, a reliable coupling of the safety valve to a container is facilitated.

According to some embodiments, it can be provided that the trigger unit comprises a glass ampoule filled with a liquid. The glass ampoule can generally be an elongated, for example cylindrically hollow, body in which a liquid is held. The glass ampoule is hermetically sealed, and a wall thickness of the glass ampoule is sized so as to collapse or break when the liquid expands as a result of increasing temperatures to the point where a pressure inside the glass ampoule exceeds a threshold. This solution offers the advantage that a trigger unit having a relatively large axial extension is viable. Nevertheless, a threshold temperature at which the trigger unit is to collapse can be adjusted very precisely, for example by the wall thickness of the glass ampoule and/or by the properties and/or the amount of the liquid. A further advantage is that the liquid does not influence the function or the mobility of the valve needle after the glass ampoule collapses. By contrast to plugs made of a fusible material, where there is a risk of the molten material re-solidifying in the valve body, there is also no need to take any action in order to convey the material or liquid out of the valve body. This facilitates the arrangement of the trigger unit within the valve body.

With respect to direction indications and axes, in particular direction indications and axes relating to the course of physical structures, a course of an axis, a direction or a structure "along" another axis, direction or structure is understood here to mean that said axis, direction or structure, in particular the tangents resulting at a respective location of the structures, extend at an angle of less than 45 degrees, preferably less than 30 degrees, and particularly preferably parallel to one another.

With respect to direction indications and axes, in particular direction indications and axes relating to the course of physical structures, a course of an axis, a direction or a structure "transverse" to another axis, direction or structure is understood here to mean that said axis, direction or structure, in particular the tangents resulting at a respective location of the structures, extend at an angle of greater than or equal to 45 degrees, preferably greater than or equal to 60 degrees and particularly preferably perpendicular to one another.

BRIEF DESCRIPTION OF THE DRAWINGS

The invention will be explained in the following with reference to the figures of the drawings. The figures show.

DETAILED DESCRIPTION

Unless otherwise stated, the same reference numbers refer to like or functionally identical components shown in the figures.

Figure 1:
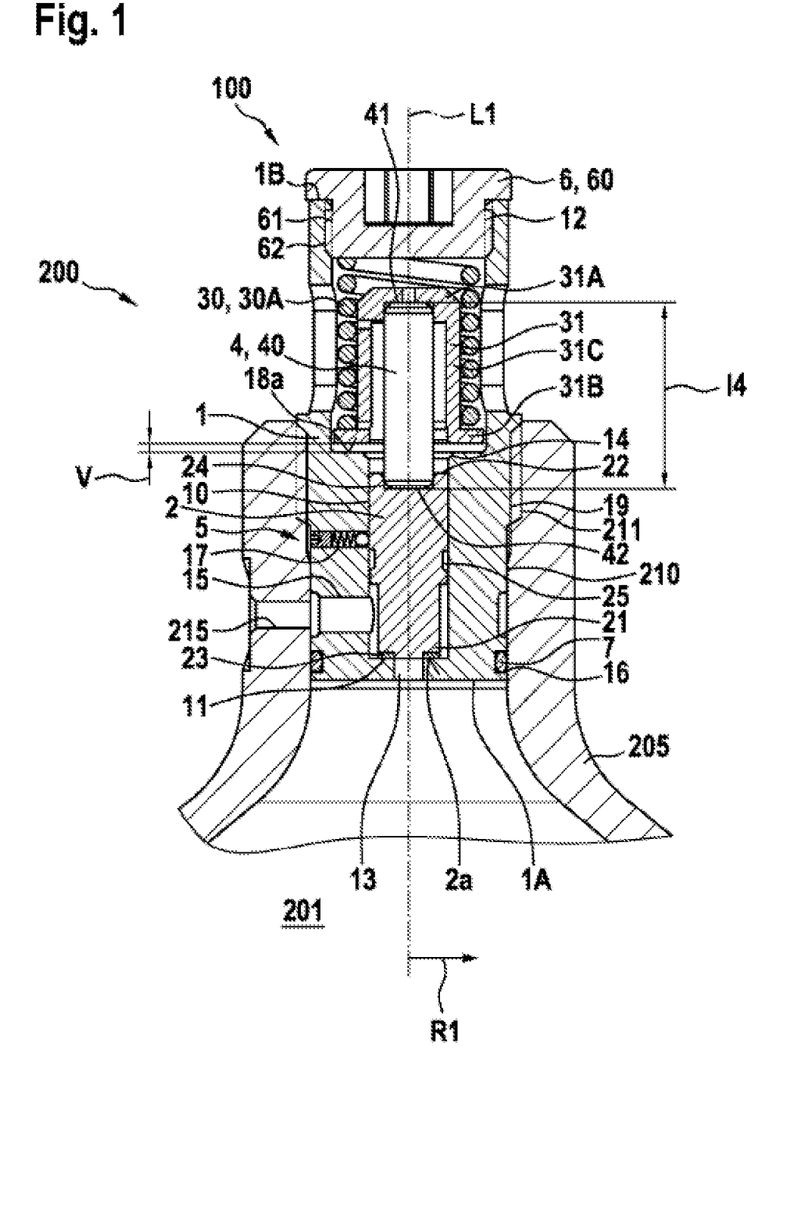
FIG. 1 a schematic cross-sectional view of a safety valve according to an embodiment example of the present invention, wherein a valve needle is arranged in a seal position and the safety valve is fixed in an opening of a container.

FIG. 1 illustrates by way of example a tank 200 having a container 205 for holding a gas, such as hydrogen, and a safety valve 100. For example, the tank 200 can be carried along in a motor vehicle (not shown) or another vehicle, such as a ship or aircraft. As shown by way of example in FIG. 1, the container 205 has an opening 210 in which the safety valve 100 is fixed. For example, the opening 210 can be equipped with an inner threading 211 in which the safety valve 100 is screwed into an outer threading 19 provided on an outer circumference of a valve body 1 of the valve 100, as shown by way of example in FIG. 1.

As shown by way of example in FIG. 1, the safety valve 100 comprises a valve body 1, a valve needle 2, a compression spring device 3, and a trigger unit 4. Optionally, a locking device 5 can further be provided, as shown by way of example in FIG. 1. A closure cap 60 can also optionally be provided.

As shown schematically in FIG. 1, the valve body 1 can be an elongated body extending between a first end 1A and a second end 1B. As shown in FIG. 1, the valve body 1 comprises a guide bore 10 defining a longitudinal axis L1. A radial direction R1 extends perpendicular to the longitudinal axis L1. For example, the valve body 1 can define a cavity extending along the longitudinal axis L1, which is delimited on one side by a shoulder surface 18a extending transversely to the longitudinal axis L1 and comprising an end opening 12 at the second end 1B of the valve body 1. As shown by way of example in FIG. 1, the guide bore 10 can extend as a blind hole from the shoulder surface 18a. The guide bore 10 thus extends between a base 11 located in the region of the first end 1A of the valve body 1 and an opposite bore opening 14. The stop surface or shoulder surface 18a thus surrounds an end of the guide bore 10 opposite the base 11 of the guide bore 10 in relation to the axial direction R1.

As further shown by way of example in FIG. 1, the valve body 1 comprises a first opening 13 formed at the base 11 of the guide bore 10 and a second opening 15 extending along the radial direction R1 and distanced to the first opening 13 and the base 11 of the guide bore 10, respectively, along the longitudinal axis L1. As shown in FIG. 1, the first opening 13 extends between the base 11 and the first end 1A or a front face of the valve body 1 forming the first end 1A, respectively. The second opening 15 extends between an inner peripheral surface defining the guide bore 10 and an outer peripheral surface of the valve body 1 opposite the radial direction R1.

As further shown by way of example in FIG. 1, the valve body 1 can further comprise an optional locking recess 17 extending between the inner peripheral surface and the outer peripheral surface of valve body 1. As shown by way of example in FIG. 1, the locking recess 17 can be positioned such that second opening 15 of valve body 1 is arranged between the locking recess 17 and the base 11 in relation to longitudinal axis L1.

As already mentioned, the valve body 1 can optionally comprise an outer threading 19 formed on its outer peripheral surface. As shown by way of example in FIG. 1, the outer threading 19 can be formed in a middle region located between the first and second ends 1A, 1B.

When the safety valve 100 is fixed in the opening 210 of the container 200, for example by screwing the outer threading 19 of the valve body 1 to the inner threading 211 of the opening 210 of the container 200 as shown by way of example in FIG. 1, the first end 1A of the valve body 1 and thus the first opening 11 of the valve body 1 faces an interior 201 of the container 200, as shown in FIG. 1. Furthermore, the second opening 15 of the valve body 1 can be arranged flush with a side opening 215 of the container 200, as shown in FIG. 1.

As further shown by way of example in FIG. 1, the valve body 1 can have a circumferential groove 16 formed on the outer peripheral surface in the region of the first end 1A, in which a seal ring 7 is received. As shown by way of example in FIG. 1, the seal ring 7 can abut an inner surface of the container 205, in particular the opening 210.

The optional closure cap 60 can be screwed into an inner threading 62 by means of an outer threading 61, for example, which is formed in the region of the second end 1B in the opening 12 of the valve body 1, as shown by way of example in FIG. 1.

The valve needle 2 can in particular be configured as a piston extending between a first end 21 and a second end 22, as shown by way of example in FIG. 1. At the first end 21, the valve needle 2 has a seal surface 2a, which is formed, for example, by a front face of the valve needle 2 itself or, as shown by way of example in FIG. 1, by a seal covering 23 connected to the front face 2a, which can be formed, for example, from an elastomeric material. A recess 24 can be formed at the second end 22, as shown by way of example in FIG. 1. Alternatively, the front face forming the second end 22 can also be level, as shown by way of example in FIG. 4.

The valve needle 2 can further optionally comprise a locking groove 25, which is formed at a distance to the first end 21 on an outer peripheral surface of the piston, as shown by way of example in FIG. 1.

As shown by way of example in FIG. 1, the valve needle 2 is movably guided in the guide bore 10 of the valve body 1 along the longitudinal axis L1. The seal surface 2a of the valve needle 2 faces the base 11 of the guide bore 10. In FIG. 1, the valve needle 2 is shown in a seal position, in which the seal surface 2a abuts the base 11 of the guide bore 10. In a release position, shown by way of example in FIG. 2, the seal surface 2a is arranged at a distance to the base 11 of the guide bore 10 and releases the first opening 13 so that gas can flow into the guide bore 10 through the first opening 13 and out of the guide bore through the second opening 15.

The compression spring device 3 comprises a spring 30 and can further comprise a spring sleeve 31, as shown by way of example in FIG. 1. For example, the spring 30 can be a spiral spring 30A, as shown in FIG. 1. As shown by way of example in FIG. 1, the spring sleeve 31 can have a sleeve body 31C, wherein a base 31A is formed at a first end of the sleeve body and a collar 31B projecting radially outward from the sleeve body 31C is formed at a second end positioned opposite thereto. The collar 31B faces the shoulder surface 18a and the base 11 of the guide bore 10, respectively.

As shown in FIG. 1, the compression spring device 3 can be arranged in the interior or plenum of the valve body 1 between the shoulder surface 18a and the end opening 12. As shown by way of example in FIG. 1, sleeve body 31C can be inserted into the spiral spring 30A, wherein the spiral spring 30A abuts the collar 31B and the closure cap 60 or another stop 6, which is fixed in place in relation to the valve body 1, in particular in relation to the base 11 of the guide bore 10.

The trigger unit 4 is thermally activatable so that it collapses when a threshold temperature is reached or exceeded. For example, the trigger unit 4 can comprise a liquid-filled glass ampoule 40, as shown by way of example in FIG. 1. When the threshold temperature is reached or exceeded, the ampoule 40 bursts as a result of too high pressure inside it, which builds up by thermal expansion of the liquid.

As shown by way of example in FIG. 1, the glass ampoule 40, or in general, the trigger unit 4, can be an elongated body extending between a first end 41 and a second end 42. The trigger unit has a predetermined length or longitudinal extension between the first and second ends 41, 42. As shown in FIG. 1, the trigger unit 4 can be arranged between the base 31A of the spring sleeve 31 and the second end 22 of the valve needle 2 in relation to the longitudinal axis L1. In particular, the trigger unit 4 is supported on the base of the base 31A of the spring sleeve 31 and on the second end 22 of the valve needle 2. For example, the second end 42 of the trigger unit 4 can be received in the recess or depression 24 formed at the second end 22 of the valve needle 2. The first end 41 of the trigger unit 4 can abut the base 31A of the spring sleeve 31 and can optionally also be received in a corresponding recess, as shown by way of example in FIG. 1.

In the state shown by way of example in FIG. 1, in which the trigger unit 4 does not collapse but rather is mechanically intact, the trigger unit 4 kinematically couples the compression spring device 3 to the valve needle 2. In particular, the spring 30 is compressed by a deflection V, thereby biasing the valve needle 2 into the seal position along the longitudinal axis L1. The extension or length 14 of the trigger unit 4 along the longitudinal axis L1 is greater than the deflection V of the spring 30. The collar 31B of the spring sleeve 31 facing the shoulder surface 18a is arranged at a distance to the shoulder surface 18a in the state shown in FIG. 1.

If a pressure within the interior 201 of the container 205 exceeds a certain threshold value that is large enough to overcome the biasing force of the spring 30, the valve needle 2 is moved axially into the release position so that gas can flow through the first opening 11 and the second opening 15 and optionally through the side opening 215.

When the temperature reaches or exceeds the trigger temperature of the trigger unit 4, the trigger unit 4 collapses. This state is shown schematically in FIG. 2. Due to the collapse the trigger unit 4, the valve needle 2 is kinematically decoupled from the compression spring device 3, because the extension or length 14 of the trigger unit 4 along the longitudinal axis L1 is greater than the deflection V of the spring 30 and can be freely axially moved in the guide bore 10. As can be further seen in FIG. 2, when the trigger unit 4 has collapsed, the collar 31B can be pushed against the shoulder surface 18a by the spring 30. The shoulder surface 18 thus forms a blocking stop, which prevents the sleeve 31 from moving further towards the valve needle 2. As can further be seen in FIG. 2, an outer diameter d2 of the valve needle 2 and an inner diameter d31 of the spring sleeve 31 and the sleeve body 31C, respectively, can be sized such that the valve needle 2 is at least partially insertable into the spring sleeve 31 when the trigger unit 4 has collapsed.

Figure 2:
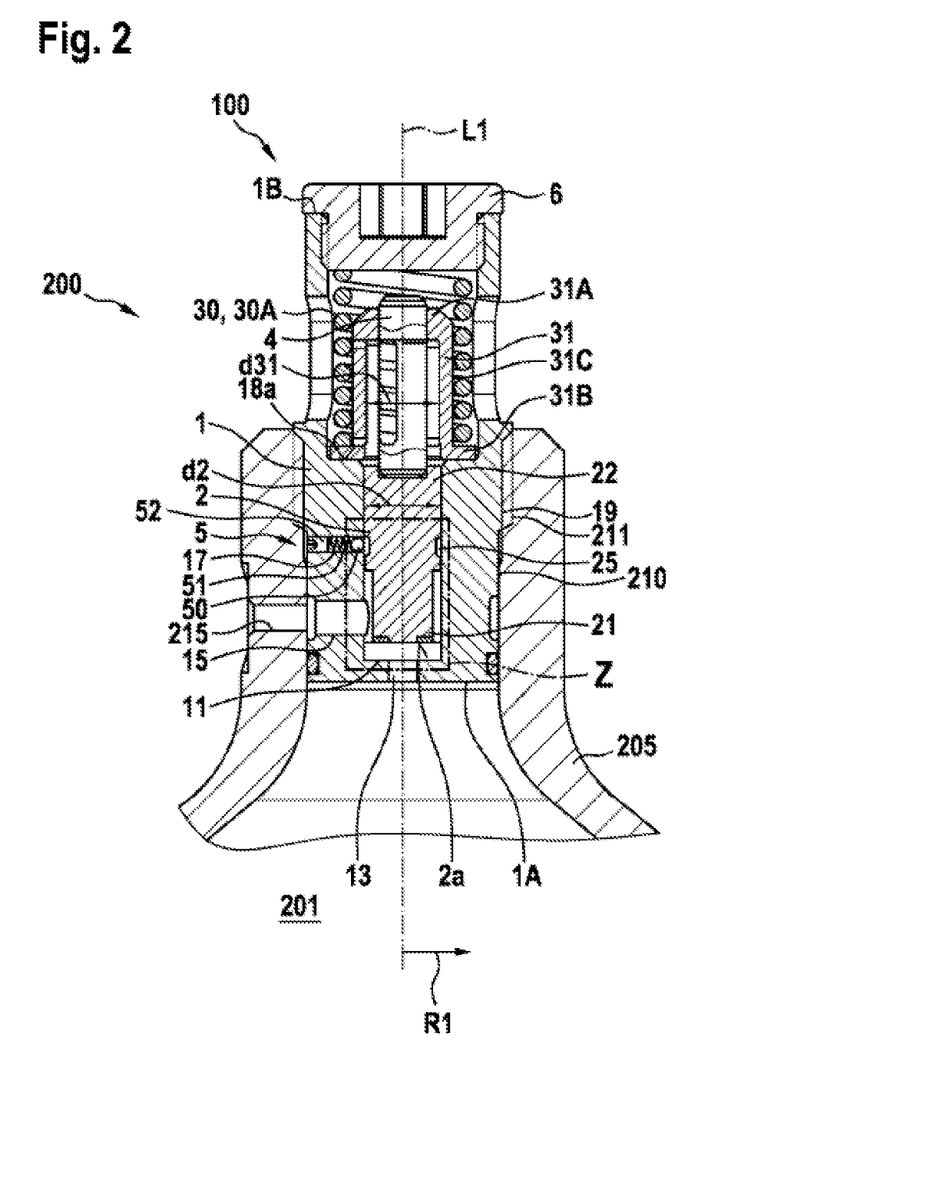
FIG. 2 the safety valve of FIG. 1, wherein a trigger unit has collapsed and the valve needle is arranged in a release position.

FIG. 2 shows purely by way of example that the valve needle 2 is locked in the release position by the optional locking device 5. This prevents the valve needle 2 from returning to the seal position.

Figure 3:
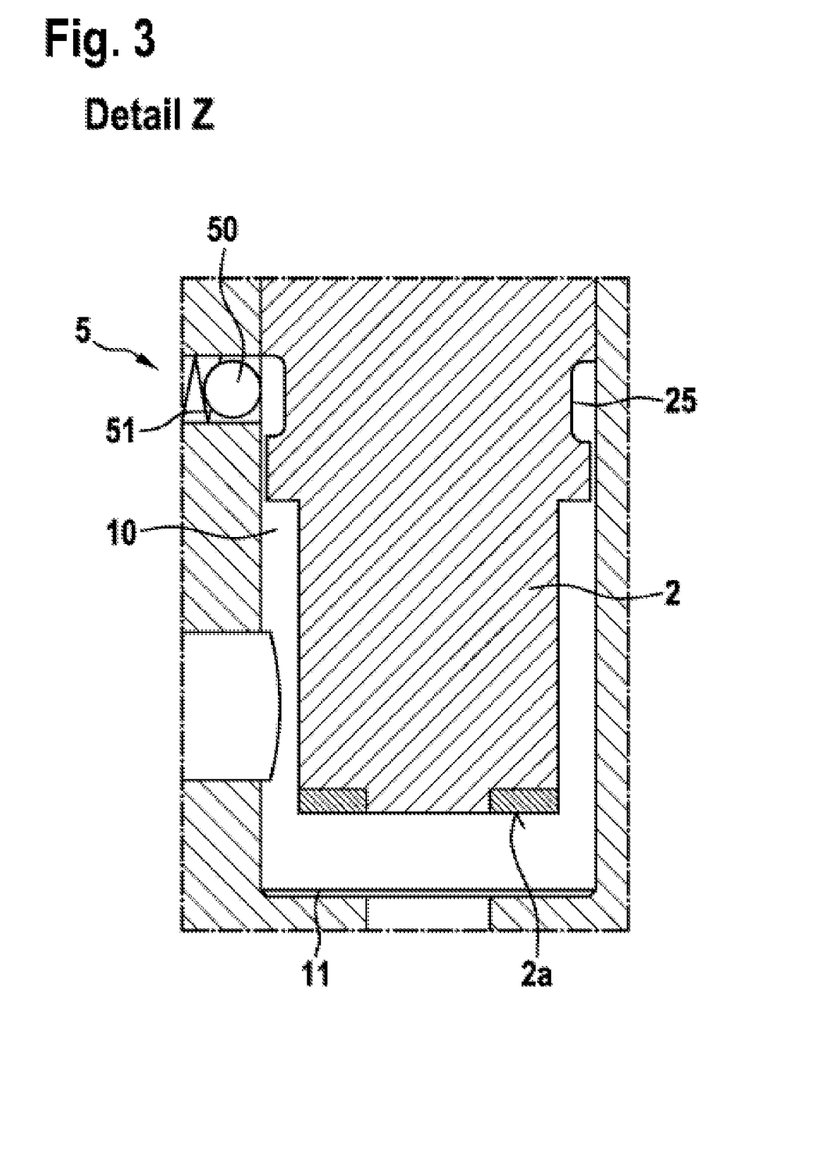
FIG. 3 a detail view of the region of the safety valve shown in FIG. 2.

The optional locking device 5 is shown in detail in FIG. 3. As shown by way of example in FIG. 3, the locking device 5 comprises a locking body 50, which can be configured, for example, as a ball, and a spring 51. The locking body 50 is movably supported in the locking recess 17 of the valve body 1. The spring 51, which can be realized, for example, as a spiral spring, is also received in the locking recess 17 and biases the locking body 50 in the direction of the guide bore 10 or in the direction of the longitudinal axis L1. For example, the spring 51 can be supported on a closure piece 52, which covers the locking recess 17 on the outer circumference of the valve body 1, as shown schematically in FIG. 2.

As can be seen in FIG. 1, the locking groove 25 of the valve needle 2 is positioned in a seal position of the valve needle 2 between the locking recess 17 and the base 11 of the valve body 1 at a predetermined distance to the locking recess 17. When the valve needle 2 is retracted into the release position such that the seal surface 2a is positioned at the predetermined distance to the base 11 of the guide bore 2, the locking groove 25 is at the same level in relation to the longitudinal axis L1 as the locking recess 17 as shown in FIGS. 2 and 3. The spring 51 thereby biases the locking body 50 into a lock position, in which the latter projects into the guide bore 10 and engages with the locking groove 25, as shown in FIGS. 2 and 3.

Figure 4:
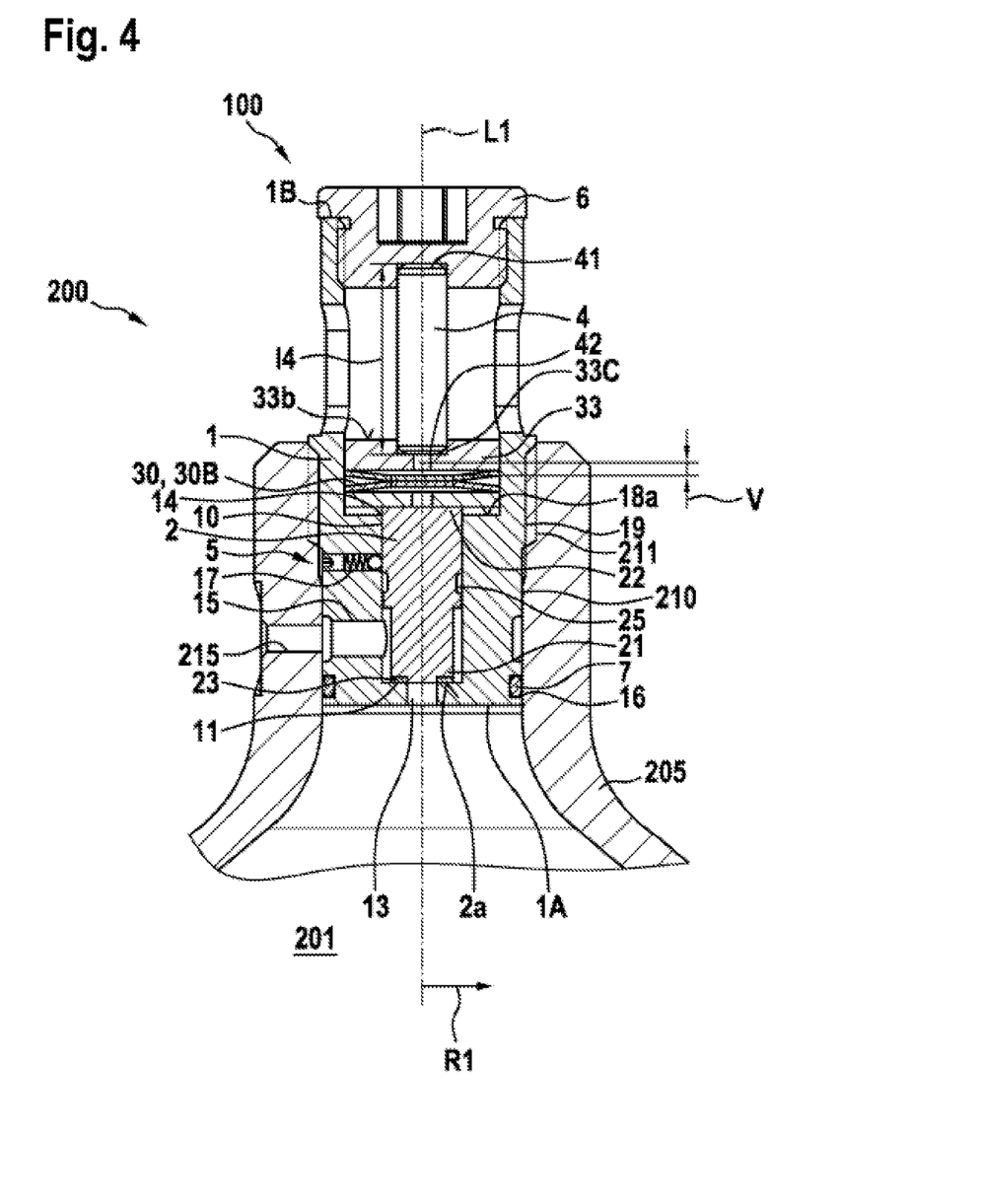
FIG. 4 a schematic cross-sectional view of a safety valve according to a further embodiment example of the present invention, wherein a valve needle is arranged in a seal position and the safety valve is fixed in an opening of a container.

By way of example, FIG. 4 shows a further safety valve 100 fixed in an opening 210 of a container 200. The safety valve 100 shown by way of example in FIG. 4 differs from the safety valve 100 shown in FIGS. 1 to 3 only in the construction of the compression spring device 3 and the arrangement of the trigger unit 4.

As shown by way of example in FIG. 4, the compression spring device 3 can comprise a spring carrier 33, and the spring 30 can be configured as a disk spring 30B. For example, the spring carrier 33 can be realized as a plate, wherein the disk spring 30B abuts a first surface 33a of the spring carrier 33. Optionally, the spring carrier 33 can have a recess 33C formed on a second surface 33b of the spring carrier 33 opposite the first surface 33a, as shown by way of example in FIG. 4.

As shown by way of example in FIG. 4, the poppet spring 30B is supported on the second end 22 of valve needle 2. The trigger unit 4, which can project, for example, into the recess 33C of the spring carrier 33, is supported on the spring carrier 33 and the closure cap 60 or another a stop 6 arranged opposite the base 11 of the guide bore 10 with respect to the longitudinal direction L1 and in a positionally fixed manner in relation to said base.

Figure 5:
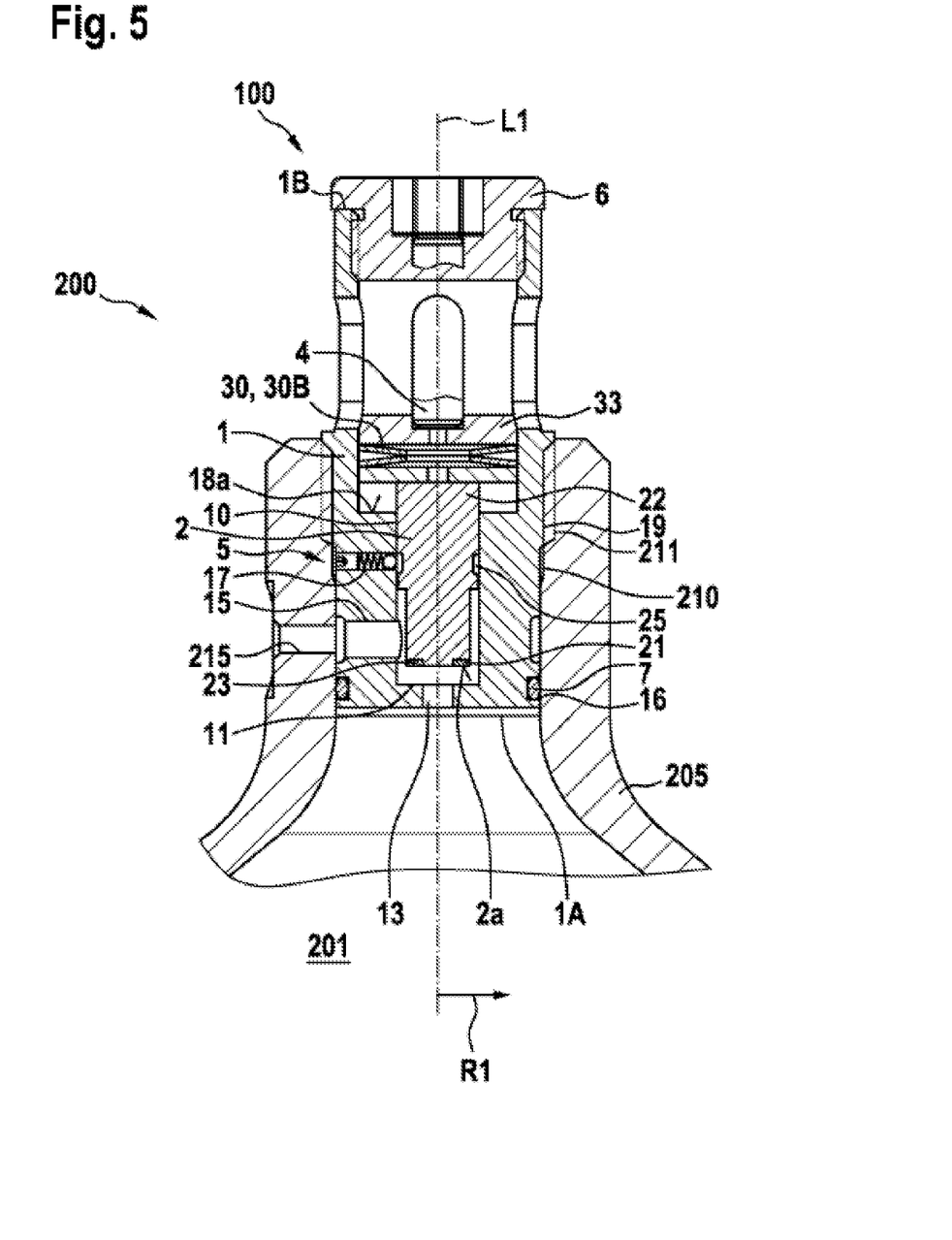
FIG. 5 the safety valve of FIG. 4, wherein a trigger unit has collapsed and the valve needle is arranged in a release position.

In FIG. 4, the trigger unit 4 is mechanically intact and the valve needle 2 is arranged in its seal position. The poppet spring 30B is arranged at a distance to the shoulder surface 18a and biases the valve needle 2 into the seal position. If the trigger unit 4 has collapsed due to a trigger temperature being exceeded, as shown schematically in FIG. 5, the compression spring device 3 is kinematically decoupled from the valve needle. In this case, the compression spring device 3 can freely escape into the cavity of the valve body 1, which extends between the shoulder surface 18a and the closure cap 60. Thus, the valve needle 2 can be moved into the release position without having to work against the biasing force of the spring 30.

Although the present invention has been explained above with reference to embodiment examples, the invention is not limited thereto and can instead be modified in a variety of ways. Combinations of the above embodiment examples are in particular also conceivable.

What is claimed is:

1. A safety valve (100), comprising:
   a valve body (1) with a guide bore (10) which defines a longitudinal axis (L1), a first opening (13) which is formed on a base (11) of the guide bore (10), and a second opening (15) which is formed at a distance to the base (11) along the longitudinal axis (L1) and which extends along a radial direction (R1) extending transversely to the longitudinal axis (L1);
   a valve needle (2) which is movably mounted in the guide bore (10) of the valve body (1) in an axial direction and which comprises a seal surface (2a) facing the first opening (13);
   a compression spring device (3) with a spring (30) that is compressed by a deflection (V) and thereby biases the valve needle (2) along the longitudinal axis (L1) into a seal position, in which the seal surface (2a) of the valve needle (2) seals the first opening (13);
   a thermally activatable trigger unit (4) which has an extension (14) along the longitudinal axis (L1), said extension being greater than the deflection (V), and which is designed to collapse when a trigger temperature is reached, wherein the compression spring device (3) is supported against the trigger unit (4); and
   a locking device (5) with a locking body (50) that is movably mounted in a locking recess (17) of the valve body (1) extending in the radial direction (R1) and a spring (51) which biases the locking body (50) in the radial direction (R1) towards the longitudinal axis (L1),
   wherein the second opening (15) of the valve body (1) is arranged in relation to the longitudinal axis (L1) between the locking recess (17) and the base (11),
   wherein the valve needle (2) comprises a locking groove (25), which is positioned in a seal position of the valve needle (2) between the locking recess (17) and the base (11) of the valve body (1) at a predetermined distance to the locking recess (17), and wherein the locking body (50) engages with the locking groove (25) in a lock position in which said body projects into the guide bore (10) when the valve needle (2) is retracted by the predetermined distance to the first opening (13).

2. The safety valve (100) according to claim 1, wherein the locking body (50) is a ball.

3. The safety valve (100) according to claim 1, wherein the compression spring device (3) comprises a spring sleeve (31) having a base (31A) and a collar (31B) lying opposite said base, and wherein the spring (30) is configured as a spiral spring (30A), which is supported on the collar (31B) of the spring sleeve (31) and a stop (6) arranged opposite the base (11) of the guide bore (10) with respect to the longitudinal direction (L1) and in a positionally fixed manner in relation to said base, and wherein the trigger unit (4) is supported on the base (31A) of the spring sleeve (31) and an end (22) of the valve needle (2) lying opposite the seal surface (2a).

4. The safety valve (100) according to claim 3, wherein the valve body (1) comprises a shoulder surface (18a), which surrounds an end of the guide bore (10) lying opposite the base (11) of the guide bore (11) in relation to the radial direction (R1), wherein the collar (31B) of the spring sleeve (31) is arranged so as to face the shoulder surface (18a) and at a distance to the shoulder surface (18a), and wherein the collar (31B) is made to rest on the shoulder surface (18a) by the spring (30) when the trigger unit (4) has collapsed.

5. The safety valve (100) according to claim 3, wherein an outer diameter (d2) of the valve needle (2) and an inner diameter (d31) of the spring sleeve (31) are sized such that the valve needle (2) is at least partially insertable into the spring sleeve (31) when the trigger unit (4) has collapsed.

6. The safety valve (100) according to claim 1, wherein the compression spring device (3) comprises a spring carrier (33), and the spring (30) is configured as a poppet spring (30B), which is connected to the spring carrier (33) and is supported on an end (22) of the valve needle (2) lying opposite the seal surface (2a), and wherein the trigger unit (4) is supported on the spring carrier (33) and a stop (6) arranged opposite the base (11) of the guide bore (10) with respect to the longitudinal direction (L1) and in a positionally fixed manner in relation to said base.

7. The safety valve (100) according to claim 1, wherein the valve body (1) comprises an outer threading (19) configured such that the valve body (1) can be screwed into an opening (210) of a container (205).

8. The safety valve (100) according to claim 1, wherein the trigger unit (4) comprises a glass ampoule (40) filled with a liquid.

9. A tank (200) having:
   a container (205) for holding a gas; and
   a safety valve (100) according to claim 1.

10. A tank (200) for a motor vehicle, the tank having:
    a container (205) for holding hydrogen gas; and
    a safety valve (100) according to claim 1.

11. The safety valve (100) according to claim 2, wherein the compression spring device (3) comprises a spring sleeve (31) having a base (31A) and a collar (31B) lying opposite said base, and wherein the spring (30) is configured as a spiral spring (30A), which is supported on the collar (31B) of the spring sleeve (31) and a stop (6) arranged opposite the base (11) of the guide bore (10) with respect to the longitudinal direction (L1) and in a positionally fixed manner in relation to said base, and wherein the trigger unit (4) is supported on the base (31A) of the spring sleeve (31) and an end (22) of the valve needle (2) lying opposite the seal surface (2a).

12. The safety valve (100) according to claim 11, wherein the valve body (1) comprises a shoulder surface (18a), which surrounds an end of the guide bore (10) lying opposite the base (11) of the guide bore (11) in relation to the radial direction (R1), wherein the collar (31B) of the spring sleeve (31) is arranged so as to face the shoulder surface (18a) and at a distance to the shoulder surface (18a), and wherein the collar (31B) is made to rest on the shoulder surface (18a) by the spring (30) when the trigger unit (4) has collapsed.

13. The safety valve (100) according to claim 12, wherein an outer diameter (d2) of the valve needle (2) and an inner diameter (d31) of the spring sleeve (31) are sized such that the valve needle (2) is at least partially insertable into the spring sleeve (31) when the trigger unit (4) has collapsed.

14. The safety valve (100) according to claim 13, wherein the compression spring device (3) comprises a spring carrier (33), and the spring (30) is configured as a poppet spring (30B), which is connected to the spring carrier (33) and is supported on an end (22) of the valve needle (2) lying opposite the seal surface (2a), and wherein the trigger unit (4) is supported on the spring carrier (33) and a stop (6) arranged opposite the base (11) of the guide bore (10) with respect to the longitudinal direction (L1) and in a positionally fixed manner in relation to said base.

15. The safety valve (100) according to claim 14, wherein the valve body (1) comprises an outer threading (19) configured such that the valve body (1) can be screwed into an opening (210) of a container (205).

16. The safety valve (100) according to claim 15, wherein the trigger unit (4) comprises a glass ampoule (40) filled with a liquid.

17. A safety valve (100), comprising:
- a valve body (1) with a guide bore (10) which defines a longitudinal axis (L1), a first opening (13) which is formed on a base (11) of the guide bore (10), and a second opening (15) which is formed at a distance to the base (11) along the longitudinal axis (L1) and which extends along a radial direction (R1) extending transversely to the longitudinal axis (L1);
- a valve needle (2) which is movably mounted in the guide bore (10) of the valve body (1) in an axial direction and which comprises a seal surface (2a) facing the first opening (13);
- a compression spring device (3) with a spring (30) that is compressed by a deflection (V) and thereby biases the valve needle (2) along the longitudinal axis (L1) into a seal position, in which the seal surface (2a) of the valve needle (2) seals the first opening (13); and
- a thermally activatable trigger unit (4) which has an extension (14) along the longitudinal axis (L1), said extension being greater than the deflection (V), and which is designed to collapse when a trigger temperature is reached, wherein the compression spring device (3) is supported against the trigger unit (4), wherein the compression spring device (3) comprises a spring sleeve (31) having a base (31A) and a collar (31B) lying opposite said base, and wherein the spring (30) is configured as a spiral spring (30A), which is supported on the collar (31B) of the spring sleeve (31) and a stop (6) arranged opposite the base (11) of the guide bore (10) with respect to the longitudinal direction (L1) and in a positionally fixed manner in relation to said base, and wherein the trigger unit (4) is supported on the base (31A) of the spring sleeve (31) and an end (22) of the valve needle (2) lying opposite the seal surface (2a).

18. The safety valve (100) according to claim 17, wherein the valve body (1) comprises a shoulder surface (18a), which surrounds an end of the guide bore (10) lying opposite the base (11) of the guide bore (11) in relation to the radial direction (R1), wherein the collar (31B) of the spring sleeve (31) is arranged so as to face the shoulder surface (18a) and at a distance to the shoulder surface (18a), and wherein the collar (31B) is made to rest on the shoulder surface (18a) by the spring (30) when the trigger unit (4) has collapsed.

19. The safety valve (100) according to claim 17, wherein an outer diameter (d2) of the valve needle (2) and an inner diameter (d31) of the spring sleeve (31) are sized such that the valve needle (2) is at least partially insertable into the spring sleeve (31) when the trigger unit (4) has collapsed.

* * * * *